Oct. 31, 1967  J. L. WATERS  3,349,920
SYSTEM FOR PROTECTING LIQUID CHROMATOGRAPHY COLUMNS
Filed Aug. 18, 1965
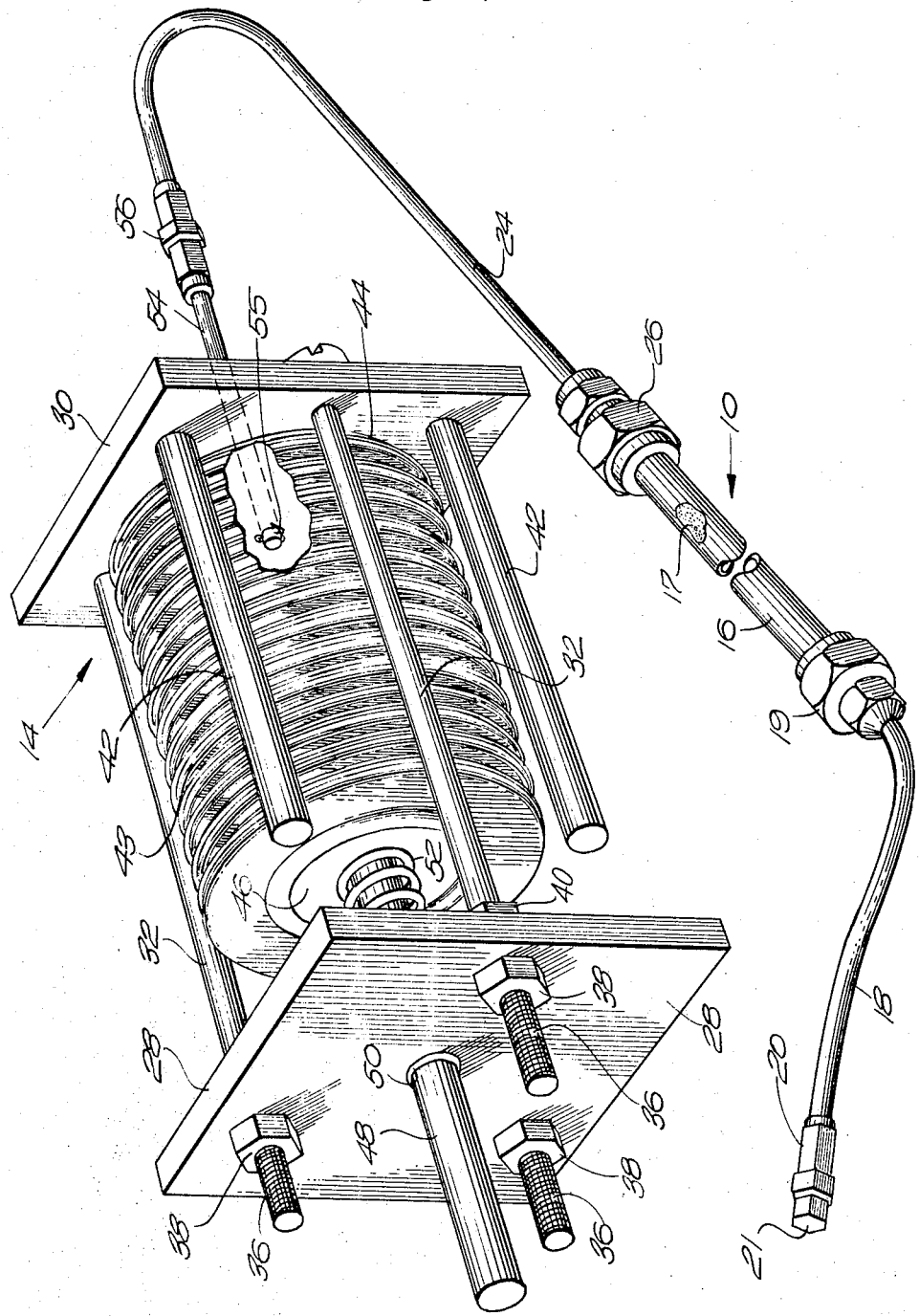
INVENTOR.
JAMES L. WATERS
BY
*Blair & Buckles*
ATTORNEYS United States Patent Office 3,349,920
Patented Oct. 31, 1967

3,349,920
SYSTEM FOR PROTECTING LIQUID CHROMATOGRAPHY COLUMNS
James L. Waters, Framingham, Mass., assignor to Waters Associates, Framingham, Mass.
Filed Aug. 18, 1965, Ser. No. 480,723
8 Claims. (Cl. 210—251)

This invention realtes to chromatography columns. It relates more particularly to a handling system for protecting such columns from the effects of environmental pressure and temperature variations.

A liquid chromatography column is used for separating materials according to significant physical properties such as adsorbability, solubility or permeability, etc. Usually these columns consist of a tubular housing having an inlet and an outlet and filled with a homogeneous packing. The packing may be any one of a variety of substances depending upon the particular application. For example, it may be a gel polymer, and substances of this type are of primary interest here.

Heretofore, the shipping and storing of liquid chromatography columns packed with porous gels has proved to be a real problem. This is because many of the porous gels used in the columns tend to shrink when exposed to the least amount of air or vapor. As a result, the packing repositions itself within the housing. While the subsequent exposure to the eluent used in the column re-swells the packing to its former size, the homogeneity of the packing is upset and channeling results. That is, distinct "paths of least resistance" appear through the packing, enabling a single substance or component to percolate through it at different rates depending on where it is in the column. As a result, experience has shown that if contacted by vapor or air for a significant length of time, the quality of the column is decreased.

While normally the columns are charged with a liquid and sealed when not in use, this alone does not protect the packing from the deleterious effects of air and vapor. For when the column is subjected to lowered temperatures, the liquid therein contracts at a greater rate than the housing. Some of the packing is thus exposed to vapor or air with the undesirable consequences noted above.

Accordingly, the principal object of this invention is means to improve the quality of liquid chromatography columns.

Another object of the invention is means to protect liquid chromatography columns from the effects of changes in temperature or pressure encountered by the columns during handling.

The invention accordingly comprises the features of construction, combination of elements, and arrangement of parts which will be exemplified in the construction hereinafter set forth, and the scope of the invention will be indicated in the claims.

For a fuller understanding of the nature and the objects of the invention, reference should be had to the following detailed description taken in connection with the accompanying drawing, which is a perspective view, with parts cut away, of a handling system for a liquid chromatography column embodying the principles of my invention.

In general, my improved system for handling chromatography columns employs an expansible chamber coupled to the column so as to form a closed, fluid tight system. The chamber and column are charged with a liquid. At normal atmospheric pressures there is essentially no undissolved air in the column and the liquid is free to expand and contract in the chamber as the temperature of the environment changes. As a result, the packing in the column is not exposed to air or vapor even at very low temperatures. Additionally, the expansible chamber is biased toward contraction so as to maintain an appreciable positive pressure within the fluid-tight system relative to the environment even in the face of altitude or temperature changes that would otherwise be reflected in pressure drops within the chamber. This prevents the air which is dissolved in the charging liquid from coming out of solution when the column is subjected to such conditions.

Referring to the drawing, my apparatus comprises more specifically a liquid chromatography column indicated generally at 10 coupled to a pressure reservoir indicated generally at 14. Column 10 comprises an elongated tubular housing 16 packed with a packing 17, such as a porous gel polymer, for example. An exteriorly threaded inlet tube 18 is connected via a coupling 19 to one end of column 10. Another coupling 20 is fitted on the free end of tube 18 and a plug 21 is removably secured in the opening into coupling 20 to close that end of the column. An outlet tube 24 is connected by way of a coupling 26 to the other end of housing 16. Tube 24 connects column 10 to the pressure reservoir 14 as will be described presently.

Reservoir 14 itself comprises a pair of end plates 28 and 30, respectively. Plates 28 and 30 are adjustably spaced apart by means of an array of three studs 32 disposed symmetrically around a bellows 43. Studs 32 are connected at one end to plate 30 and extend up through openings in plate 28. The end 36 of each stud 32 is threaded and carries correspondingly threaded double nuts 38 and 40. The nuts 38 are positioned on one side of plate 28 while the nuts 40, only one of which is visible in the drawing, are on the other side, each pair of nuts serving to lock the plate 28 at a desired level along the studs 32.

Three additional larger diameter studs 42 extend away from plate 30 parallel with studs 32. These are arranged alternately with the studs 32 so as to form a restraining and protective cage around the bellows 43. Studs 42 extend only part of the way toward plate 28.

The longitudinally extensible bellows 43 is secured at one end 44 to plate 30, while the other end 46 of the bellows is free to move lengthwise relative to plate 30 in the space within the studs. A shaft 48, secured at one end to the end 46 of bellows 43, extends through plate 28, being slidably received in an opening 50 therein. Shaft 48 helps to confine the bellows to axial motion between the plates.

A coil compression spring 52 is mounted coaxially on the portion of shaft 48 between plate 28 and the end 46 of bellows 43. Spring 52 compresses the bellows lengthwise, the degree of compression being determined by the position of plate 28 on studs 32.

An inlet tube 54 extending through an opening 55 in plate 30 communicates with the interior of bellows 43. The outer end of tube 54 is removably connected by way of a coupling 56 to tube 24 of column 10.

Before shipping the column 10, it is filled with the packing, which remains completely immersed in the liquid throughout the filling procedure. The outlet tube 24 is coupled to the tube 54 leading to bellows 43, which has already been charged with the liquid. In this way, the charging liquid does not have to percolate through the packing 17 to fill the bellows. The pressure of the charging liquid should be such as to expand the bellows 43 somewhat so that the bellows is not in its inner or fully compressed state initially. Finally, the plug 21 is affixed, thereby sealing the entire system.

At this point, there is no undissolved air or vapor in the column because it is packed along with liquid. Furthermore, the charging liquid is free to expand and contract with changes in temperature by virtue of the resilience of bellows 43 and spring 52. As the liquid contracts with decreasing temperature, the bellows 43 will contract correspondingly so that no vacuum is produced in the column 10, and no air comes out of solution.

The bellows 43 will ordinarily transmit atmospheric pressure changes to the interior of column 10. Thus, if the pressure outside the column drops appreciable due, say, to shipping the column in an unpressurized aircraft, the pressure reduction transmitted to the interior of the column by an unbiased bellows might cause air in the liquid therein to come out of solution. This in turn will shrink the gel packing as described above.

To provide protection against these low pressures, the bellows 43 is placed under compression by adjusting the nuts 38 and 40 down on shafts 32. This draws plates 28 and 30 closer together, thereby increasing the force of the spring 52 on the bellows. Alternatively, the bellows 43 itself may be constructed so as to be self biasing toward its inner or collapsed condition.

The bias on the bellows should be at least enough so that when the pressure outside the column drops to one third of the atmospheric pressure at sea level, the pressure inside the column still remains above the sea level pressure. This will suffice to prevent any air that may be in the charging liquid from coming out of solution due to translation of atmospheric pressure changes to the interior of the chamber by the bellows 43.

Upon reaching its destination, the column 10 is uncoupled from the reservoir 14. Then it may be used in the usual manner without any loss of quality due to channeling.

In summary, then, I have described a new system for protecting liquid chromatography columns from the effects of pressure and temperature changes during shipment. With my apparatus, such columns may be shipped or stored under adverse conditions for long periods of time with no attendant reduction in the quality of the columns.

It will be seen that the objects set forth above, among those made apparent from the preceding description are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A system for protecting a liquid chromatography column against certain environmental conditions, said system comprising:
   (A) a liquid chromatography column;
   (B) means defining an expansible fluid tight chamber;
   (C) a fluid tight connection between the interior of said column and said chamber,
   (D) a liquid completely filling the available space in said column, chamber and connection, and
   (E) means for maintaining said liquid under sufficient pressure to prevent undissolved air and vapor from forming in said column under the atmospheric pressure to which the column is subjected.

2. A system for protecting a liquid chromatography column against certain environmental conditions, said system comprising:
   (A) a liquid chromatography column, said column having
      (1) a pair of passages leading into and out of said column,
      (2) a packing;
   (B) means defining a fluid tight chamber, said chamber being expansible between a fully collapsed condition and a fully expanded condition;
   (C) means for connecting said chamber to one of said passages;
   (D) a liquid completely filling the available space in said column, chamber and connecting means, said fluid being under sufficient pressure to expand said chamber away from its fully collapsed condition, and
   (E) means for closing the other one of said passages.

3. A system for protecting a liquid chromatography column as defined in claim 2 further including means for biasing said chamber toward its fully collapsed condition so as to maintain said fluid under appreciable positive pressure.

4. A system for handling a liquid chromatography column as defined in claim 3 wherein said biasing means is arranged to maintain the pressure within said column above the atmospheric pressure at sea level when the pressure outside of said column is one-third said sea level pressure.

5. A system for protecting a liquid chromatography column from certain environmental conditions, said system comprising:
   (A) a liquid chromatography column having an inlet and an outlet;
   (B) a bellows extensible between an inner position and an outer position;
   (C) bellows supporting means arranged to apply pressure to said bellows;
   (D) a fluid tight connection between the interior of said bellows and one of said inlet and outlet;
   (E) means for closing the other of said inlet and outlet so that said bellows, column and connection define a closed, fluid tight system, and
   (F) a liquid completely filling the available space in said column, bellows and connection, the volume of said liquid in said system being sufficient to maintain said bellows in a partially expanded condition intermediate its two said positions.

6. A system for protecting a liquid chromatography column as defined in claim 5 wherein said bellows supporting means includes a spring acting on said bellows so as to bias said bellows toward its inner position, thereby maintaining said liquid in said system under appreciable positive pressure.

7. Apparatus for protecting a liquid chromatography column from certain environmental conditions, said system comprising:
   (A) a pair of spaced-apart plates;
   (B) a plurality of studs, each stud having one end fixed to one of said plates and another end adjustably secured to the other of said plates;
   (C) said plates and studs together defining a bellows supporting cage;
   (D) a bellows mounted within said cage, said bellows having one end secured to one of said plates and its other end opposite the other of said plates;

(E) a spring compressed between said opposing bellows end and plate;
(F) a fluid conduit leading to the interior of said bellows;
(G) a liquid chromatography column, and
(H) means for connecting said conduit to the interior of said column.

8. Apparatus for protecting a liquid chromatography column as defined in claim 7 wherein
(A) said spring is a coil spring;
(B) said other of said plates has a passage therethrough overlying said spring, and
(C) a shaft slidably received through said passage and said spring, said shaft having one end secured to said other end of said bellows whereby to maintain said bellows in alignment within said cage.

No references cited.

SAMIH N. ZAHARNA, *Primary Examiner.*